(No Model.)
S. T. JOHNSON.
CLUTCH COUPLING.
No. 564,488. Patented July 21, 1896.
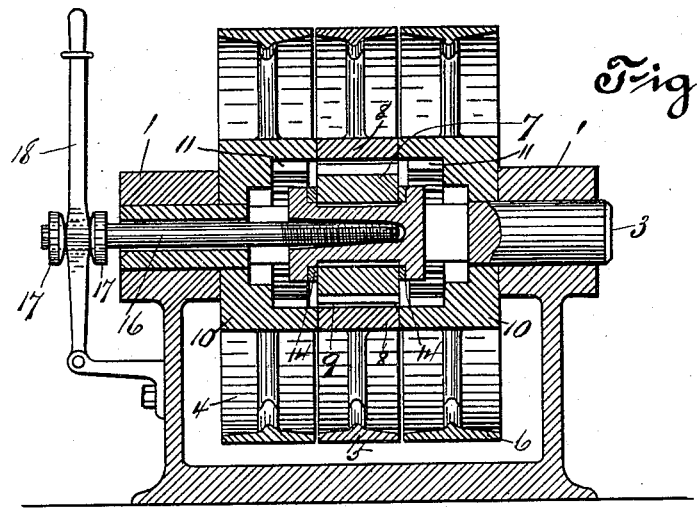
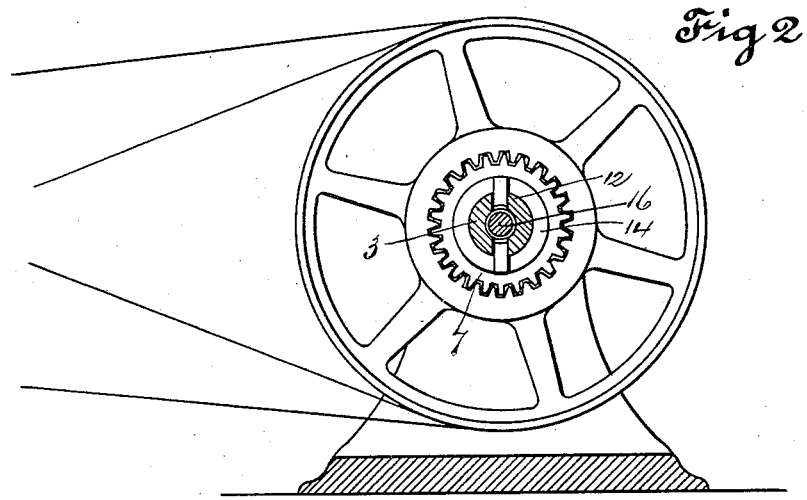
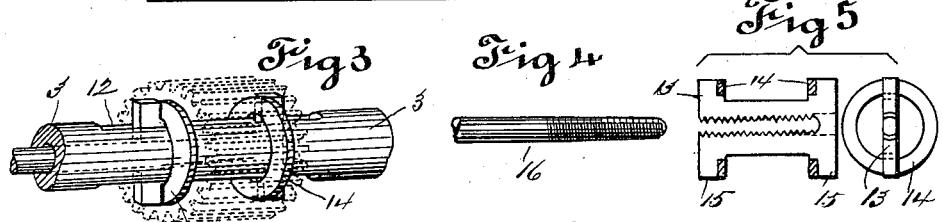
Witnesses
Inventor
Seward T. Johnson
By his Attorney
Thompson R. Bell

UNITED STATES PATENT OFFICE.

SEWARD T. JOHNSON, OF NOBLESVILLE, INDIANA.

CLUTCH-COUPLING.

SPECIFICATION forming part of Letters Patent No. 564,488, dated July 21, 1896.

Application filed June 17, 1895. Serial No. 553,164. (No model.)

*To all whom it may concern:*

Be it known that I, SEWARD T. JOHNSON, a citizen of the United States, residing at Noblesville, in the county of Hamilton and State of Indiana, have invented new and useful Improvements in Clutch-Couplings, of which the following is a specification.

My invention relates to certain new and useful improvements in clutches; and it consists in a novel means whereby the clutch may be directly connected to a shifting-rod passing through a tubular end portion of the shaft whereon said clutch is mounted and is operated directly thereby.

The object of this invention is to provide a clutch that can be used and operated in connection with wheels or pulleys mounted abreast or closely together on the same shaft, and where the usual exteriorly-connected clutch cannot be used.

In the accompanying drawings similar numbers of reference designate like parts throughout the several views.

Figure 1 is a longitudinal sectional elevation of a counter-shaft and its supporting frame or stand, and showing three pulleys mounted abreast thereon, and showing my clutch applied thereto. Fig. 2 is a sectional end elevation of the same. Fig. 3 is a detail broken perspective view of the counter-shaft and the clutch engaging or retaining key, and showing the clutch in dotted lines. Fig. 4 is a detail broken view of the shifting-rod, showing the tapered threaded end thereof; and Fig. 5 is a detail side and end views of the clutch-key, and showing the keep-collars applied thereon.

In suitable supporting-bearings 1 is mounted the counter-shaft 3. On the shaft 3 are loosely mounted the pulleys 4, 5, and 6, which are adapted to turn freely thereon. The outer pulleys 4 and 6 are arranged to be rotated in opposite directions—that is, the pulley 4 may have a right-hand rotation, while the pulley 6 may have a left-hand rotation—which directions of rotation may be imparted to the said pulleys by means of the usual open and cross driving-belts.

The toothed clutch 7 is mounted loosely on the shaft 3 and is adapted to freely rotate and to slide longitudinally thereon. The hub 8 of the intermediate pulley 5 is formed with the internal gear-teeth 9, adapted to accurately fit and to mesh with the gear-teeth of the clutch 7.

The outer bearing portions of the hubs 10 of the outer or loose pulleys 4 and 6 are bored to receive the shaft 3 on which the said pulleys turn, and are provided with the internal gear-teeth 11, formed in the enlarged recessed ends of the hubs, and are adapted to receive and to accurately fit the teeth of the clutch 7. The shaft 3 is provided with the central key-slot 12, wherein the clutch-key 13 accurately fits and freely slides longitudinally, said slot being of sufficient length to permit the said key 13 to travel an amount equal to the extreme travel of the clutch 7.

The key 13 is adapted to receive the keep washers or collars 14, which are held thereon by the lugs or gibs 15 of the said key, and between these collars loosely fits and freely turns the clutch 7. The key 13 is slit or split centrally and longitudinally almost its entire length, and the opposite edges of the slit are threaded to receive the threaded tapered end of the shifting-rod 16, by the screwing of which into the said key-slit the opposite sections of the key are expanded to tightly and firmly hold the end keep-collars 14. The shifting-rod 16 is adapted to slide longitudinally in the tubular portion of the main shaft or axle 3, and on its outer projecting end is firmly secured the collars 17.

The clutch-shaft lever 18 is fulcrumed at its bottom end to the main frame in any suitable manner, and the said lever is provided with a central slotted opening adapted to receive that portion of the shifting-rod between the fixed collars, between which fixed collars the said lever works to operate the shifting rod.

To apply the keep-collars 14 to the keys 13, and also the clutch 7, the said key is first introduced into the said key-slot of the axle 3, with its slit or split end directed toward the tubular portion of the shaft. The clutch 7 and the keep-collars 14, between which the clutch 7 rotates, are now placed on the shaft 3. The key 13 is compressed at its slit end till the top of the lugs 15 are flush with the edge of the slot and the keep-collars 14 and the clutch 7 are moved over said key and between said lugs or gibs 15, by which they are held in position. The shifting-rod is now introduced into the tubular portion of the shaft 3 and its tapered inner end is introduced into the threaded slit of the key 13, and is screwed therein to expand the same to firmly hold the said keep-collars 14.

The gib-key 13 may be composed of two opposite gib-keys, each of which have their inner edges threaded to engage the tapered threaded end of the shifting-rod 16, which construction would be equivalent to extending the slot of the key 13, as shown in dotted lines in Fig. 5.

In the arrangement of pulleys illustrated in the accompanying drawings the outer pulleys may be considered as driving-pulleys, and are rotated in opposite directions to rotate the clutch or intermediate pulley in either direction when connected by the clutch to either of the outer pulleys—that is, in the same direction as the pulley with which it is connected by the clutch 7—or the intermediate or clutch pulley may be considered as the driver, and the outer pulleys may be connected directly to other pulleys by open and cross belts to produce reverse rotations.

The movement of the clutch 7 into engagement with either the pulleys 4 and 6 is accomplished by means of the shifting-lever and needs no special description.

Having thus fully described the construction and operation of my invention, what I claim as new and useful, and desire to cover by Letters Patent of the United States therefor, is—

1. In a clutch-coupling, the combination of a shaft supported at both ends, a clutch having parallel peripheral teeth and adapted to turn and to slide longitudinally on said shaft, an intermediate pulley mounted on said clutch and adapted to turn therewith but not to slide thereon, loose pulleys mounted on said shaft on opposite sides of said pulley, hubs on the said pulleys having their inner faces recessed to receive and to engage said clutch, and means whereby the latter is moved into alternate engagement with the outer pulleys.

2. In a clutch-coupling, the combination with a fixed tubular shaft supported at its ends and having a central slot-opening, of a clutch having parallel peripheral teeth and adapted to turn and to slide longitudinally on said shaft, an intermediate pulley mounted on said clutch and adapted to turn therewith but not to slide thereon, loose pulleys mounted on said shaft on opposite sides of said intermediate pulley, hubs on the said pulleys having their inner faces recessed to receive and to engage said clutch, a key adapted to slide in said slot and having gibbed ends adapted to receive said clutch, a shifting-rod connected to said key and inclosed in said tubular shaft and means whereby said rod is moved to slide said key and said clutch.

3. In a clutch-coupling, the combination with a tubular fixed shaft having a central key-slot, of a clutch having parallel peripheral teeth and adapted to turn and to slide longitudinally on said fixed shaft, an intermediate pulley mounted on said clutch and adapted to turn therewith but not to slide thereon, of outer pulleys mounted loosely on said shaft on opposite sides of said intermediate pulley, hubs on said outer pulleys having their inner faces recessed to receive and to engage said clutch, a gibbed clutch-key having a central slit, said key adapted to receive and retain said clutch in position, collars on said key between the gibs thereof and the ends of the said clutch, a rod connected to said key and means whereby the said rod is moved longitudinally to shift said clutch.

4. In a clutch-coupling, the combination with a tubular fixed shaft, of a clutch adapted to turn and to slide longitudinally thereon, a gib-key adapted to engage said clutch and having a central longitudinal slit, a clutch-shifting rod having its tapered threaded end adapted to be screwed into said slit to expand the key, and keep washers on said key at the ends of said clutch, and suitable means whereby said clutch is traversed along said shaft, substantially as and for the purpose set forth.

5. In a clutch-coupling, a tubular fixed shaft having a slotted key-opening, a clutch adapted to turn and to slide longitudinally on said shaft, keep-collars contiguous to the ends of said clutch, gib-keys adapted to receive said keep-collars and said clutch and having their parallel edges threaded, a shifting-rod adapted to slide in said shaft and having its tapered threaded end adapted to be screwed between said gib-keys to expand the same and suitable means whereby said clutch is traversed along said shaft, as set forth.

In testimony whereof I have hereunto set my hand in the presence of two subscribing witnesses.

SEWARD T. JOHNSON.

Witnesses:
ALBERT J. SCOTT,
OSWALD JACKSON.